(12) United States Patent
Smith et al.

(10) Patent No.: US 11,365,995 B2
(45) Date of Patent: *Jun. 21, 2022

(54) MAGNETIC FLOWMETER INCLUDING AUXILIARY ELECTRODES UPSTREAM AND DOWNSTREAM OF THE PAIR OF MEASURING ELECTRODES AND AN ADJUSTABLE BRACE

(71) Applicant: Georg Fischer Signet, LLC, El Monte, CA (US)

(72) Inventors: Michael Smith, Yorba Linda, CA (US); Paxton Gross, Schaffhausen (CH); Calin Ciobanu, Brea, CA (US); Kevin Franks, Montclair, CA (US)

(73) Assignee: Georg Fischer Signet LLC, El Monte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,090

(22) Filed: Sep. 28, 2018

(65) Prior Publication Data

US 2020/0103261 A1     Apr. 2, 2020

(51) Int. Cl.
*G01F 1/58* (2006.01)
*G01F 1/60* (2006.01)

(52) U.S. Cl.
CPC ............. *G01F 1/588* (2013.01); *G01F 1/60* (2013.01)

(58) Field of Classification Search
None
See application file for complete search history.

(56) References Cited

U.S. PATENT DOCUMENTS

| 4,290,312 A | * | 9/1981 | Kobayashi | G01F 1/58 |
| | | | | 73/861.12 |
| 4,524,627 A | * | 6/1985 | Yamasaki | G01F 1/58 |
| | | | | 73/861.12 |
| 5,224,394 A | | 7/1993 | Kalinoski | |

(Continued)

FOREIGN PATENT DOCUMENTS

| CN | 1241714 | 1/2000 |
| CN | 102564503 | 7/2012 |

(Continued)

OTHER PUBLICATIONS

Jorg Holtmann, Virtual Reference for Electromagnetic Flowmeters, EngineerIT, Jun. 2013, http://www.ee.co.za/wp-content/uploads/legacy/EngineerIT_2013/EngIT_June%20%202013_MeasT_Krohne.pdf.

(Continued)

*Primary Examiner* — Harshad R Patel
(74) *Attorney, Agent, or Firm* — Harness, Dickey & Pierce, P.L.C.

(57) ABSTRACT

A magnetic flowmeter assembly is provided having a tubular body, having opposing open ends and defining a fluid flow path therebetween along a longitudinal axis (Ax). A pair of coil assemblies is coupled to the tubular body in an intermediate region thereof supported by an adjustable brace. A pair of measuring electrodes is attached to the tubular body in electrical communication with the fluid with the flow path and aligned along an axis (Ay) orthogonal to the longitudinal axis (Ax) and orthogonal to the axis (Az). Auxiliary electrodes are disposed upstream and downstream of the pair of measuring electrodes.

16 Claims, 4 Drawing Sheets

(56) References Cited

U.S. PATENT DOCUMENTS

| | | | |
|---|---|---|---|
| 5,280,727 A * | 1/1994 | Hafner | G01F 1/584 73/861.11 |
| 5,327,787 A * | 7/1994 | Kiene | G01F 1/002 73/215 |
| 5,375,475 A * | 12/1994 | Kiene | G01F 1/002 73/861.12 |
| 5,402,685 A | 4/1995 | Brobeil | |
| 5,693,892 A * | 12/1997 | Batey | G01F 1/002 73/861.11 |
| 5,708,212 A * | 1/1998 | Batey | G01F 1/586 73/861.12 |
| 6,611,775 B1 | 8/2003 | Coursolle et al. | |
| 6,829,946 B2 | 12/2004 | Yamamoto | |
| 6,920,799 B1 | 7/2005 | Schulz | |
| 7,084,647 B2 | 8/2006 | Rosskopf et al. | |
| 7,310,582 B2 | 12/2007 | Ishikawa | |
| 7,369,949 B2 | 5/2008 | Yamamoto | |
| 7,921,733 B2 | 4/2011 | Foss et al. | |
| 8,047,080 B2 | 11/2011 | Ishikawa et al. | |
| 8,136,412 B2 | 3/2012 | Yamamoto et al. | |
| 8,159,806 B2 | 4/2012 | Cartier-Millon et al. | |
| 8,499,647 B2 | 8/2013 | Mitsutake | |
| 8,590,361 B1 | 11/2013 | Feller | |
| 9,389,107 B2 | 7/2016 | Voigt et al. | |
| 2005/0115334 A1* | 6/2005 | Brockhaus | G01F 1/60 73/861.11 |
| 2006/0150746 A1 | 7/2006 | Keese et al. | |
| 2006/0162465 A1* | 7/2006 | Sulzer | C08G 18/10 73/861.12 |
| 2006/0174715 A1* | 8/2006 | Wehrs | G01F 1/588 73/861.12 |
| 2007/0163360 A1* | 7/2007 | Baecker | G01F 1/58 73/861.12 |
| 2008/0060447 A1* | 3/2008 | Lincoln | G01F 1/586 73/861.12 |
| 2008/0127712 A1* | 6/2008 | Baker | G01F 1/60 73/1.16 |
| 2009/0038409 A1* | 2/2009 | Ruchel | G01F 1/58 73/861.12 |
| 2009/0308175 A1* | 12/2009 | Magliocca | G01F 1/586 73/861.12 |
| 2010/0107776 A1* | 5/2010 | Shanahan | G01F 1/60 73/861.11 |
| 2010/0132479 A1* | 6/2010 | van Willigen | G01F 1/584 73/861.12 |
| 2011/0113895 A1* | 5/2011 | Kerrom | G01F 15/14 73/861.12 |
| 2012/0036941 A1* | 2/2012 | Drahm | G01F 1/58 73/861.12 |
| 2013/0036817 A1* | 2/2013 | Lucas | G01F 1/588 73/32 R |
| 2014/0083199 A1* | 3/2014 | Rogers | G01F 1/584 73/861.12 |
| 2014/0083200 A1* | 3/2014 | Rogers | G01F 1/588 73/861.12 |
| 2014/0150567 A1* | 6/2014 | Voigt | G01F 1/586 73/861.11 |
| 2014/0157910 A1* | 6/2014 | Voigt | G01F 1/586 73/861.11 |
| 2014/0251025 A1* | 9/2014 | Rogers | G01F 1/584 73/861.12 |
| 2015/0168188 A1* | 6/2015 | Reichart | G01F 1/584 73/861.12 |
| 2015/0219481 A1* | 8/2015 | Kersey | G01F 1/586 73/861.08 |
| 2015/0268075 A1* | 9/2015 | Rovner | G01F 1/586 73/861.12 |
| 2015/0316399 A1* | 11/2015 | Graf | G01F 1/588 73/861.12 |
| 2017/0131131 A1* | 5/2017 | Keech | G01F 1/588 |
| 2017/0343396 A1* | 11/2017 | Spahlinger | G01F 1/584 |
| 2019/0285444 A1* | 9/2019 | Inagaki | G01F 15/14 |
| 2020/0256714 A1* | 8/2020 | Ciobanu | G01F 1/588 |

FOREIGN PATENT DOCUMENTS

| | | | |
|---|---|---|---|
| CN | 203011446 | 6/2013 | |
| CN | 104251929 | 12/2014 | |
| CN | 204556037 | 8/2015 | |
| CN | 204740058 | 11/2015 | |
| CN | 204831409 | 12/2015 | |
| CN | 204963919 | 1/2016 | |
| CN | 205209562 | 5/2016 | |
| CN | 205212813 | 5/2016 | |
| CN | 205300667 | 6/2016 | |
| CN | 205352482 | 6/2016 | |
| CN | 205679302 | 11/2016 | |
| CN | 205719128 | 11/2016 | |
| CN | 105422960 | 11/2017 | |
| CN | 206638287 | 11/2017 | |
| CN | 206638288 | 11/2017 | |
| CN | 206818260 | 12/2017 | |
| EP | 0306895 | 3/1989 | |
| GB | 2183943 | 6/1987 | |
| JP | 2001235352 | 8/2001 | |
| JP | 2001241983 | 9/2001 | |
| JP | 2003042821 | 2/2003 | |
| JP | 2004069630 | 3/2004 | |
| JP | 2004156936 | 6/2004 | |
| JP | 2007151311 | 6/2007 | |
| JP | 2007315813 | 12/2007 | |
| JP | 2010271042 | 12/2010 | |
| JP | 2011033491 | 2/2011 | |
| WO | WO-2006051337 A1 * | 5/2006 | G01F 1/58 |
| WO | WO-2013010715 A1 * | 1/2013 | G01F 1/588 |
| WO | WO-2014072194 A1 * | 5/2014 | G01F 15/14 |

OTHER PUBLICATIONS

Ralf Haut, Virtual Reference Grounding for Electromagnetic Flowmeters, Manufacturing.net, Jan. 10, 2012, https://www.manufacturing.net/article/2012/01/virtual-reference-grounding-electromagnetic-flowmeters.

Universal Flow Monitors, Magnetic Flowmeter Technology, www.flowmeters.com/magnetic-technology.

Krohne, Optiflux 4300, Electromagnetic flowmeters, https://ci.krohne.com/en/products/flow-measurement/flowmeters/electromagnetic-flowmeters/optiflux-4300/.

* cited by examiner

MAGNETIC FLOWMETER INCLUDING AUXILIARY ELECTRODES UPSTREAM AND DOWNSTREAM OF THE PAIR OF MEASURING ELECTRODES AND AN ADJUSTABLE BRACE

FIELD OF THE INVENTION

The present invention relates generally to sensors for measuring fluids, more particularly, to magnetic flowmeter assemblies for flow measurement.

BACKGROUND OF THE INVENTION

Magnetic flowmeter assemblies measure the velocity of conductive liquids passing through pipes, by generating a magnetic field within the pipe and measuring the resultant voltage generated. More particularly, such flowmeters rely upon Faraday's Law, in which the flow of conductive liquid through a magnetic field causes a voltage signal that is sensed by electrodes within the pipe, the sensed voltage is proportional to the fluid flow.

Typically, magnetic flowmeter assemblies are configured as either insertion magmeters or full-bore magmeters. The insertion magmeter typically includes a sensor body that projects into a fluid flow system and electrodes disposed on spaced apart surfaces at the distal end of the sensor body. The sensor generates a magnetic field proximate to the electrode, which causes a voltage sensed by the electrodes. Full-bore magmeters typically comprise a tubular body disposed inline along a fluid flow system that includes electrodes molded into the walls of the tubular body and that include a magnetic field generated within the tubular body.

Although such devices are generally effective, shortfalls exist. For examples, such sensor assemblies can suffer from insufficient linearity and dynamic range of measurements therefrom. Moreover, current magnetic flowmeter often comprise a measurement section that differs in size from other portions of the fluid flow system. For example, the measurement section often is a different diameter and is formed of different material, which can adversely influence accuracy. Many full-bore magmeters have a body made out of metal, requiring electrical insulation for the electrodes, and further requiring plastic liners for chemical resistance. All of these methods complicate construction and dramatically increase the weight of the flowmeter.

It should, therefore, be appreciated there remains a need for a magnetic flowmeter assembly that addresses these concerns. The present invention fulfills these needs and others.

SUMMARY OF THE INVENTION

Briefly, and in general terms, a full-bore magnetic flowmeter assembly is provided a tubular body having opposing open ends and defining a fluid flow path therebetween along a longitudinal axis (Ax). The tubular body attaches inline within a fluid flow system; the body defines a plurality of apertures spaced part from each other. A pair of coil assemblies is coupled to the tubular body in an intermediate region thereof. The pair of coil assemblies is each disposed external to the tubular body on opposing sides of the body aligned along an axis (Az), to generate a magnetic field within the fluid flow path of the tubular body. A pair of measuring electrodes is attached to the tubular body. Each measuring electrode of the pair of electrodes is coupled to a corresponding aperture of the plurality of apertures to be in electrical communication with the fluid with the flow path. The pair of electrodes are aligned along an axis (Ay) orthogonal to the longitudinal axis (Ax) and orthogonal to the axis (Az). A plurality of auxiliary electrodes are attached to the tubular body, including a first auxiliary electrode and a second auxiliary electrode that are disposed upstream of the pair of measuring electrodes.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
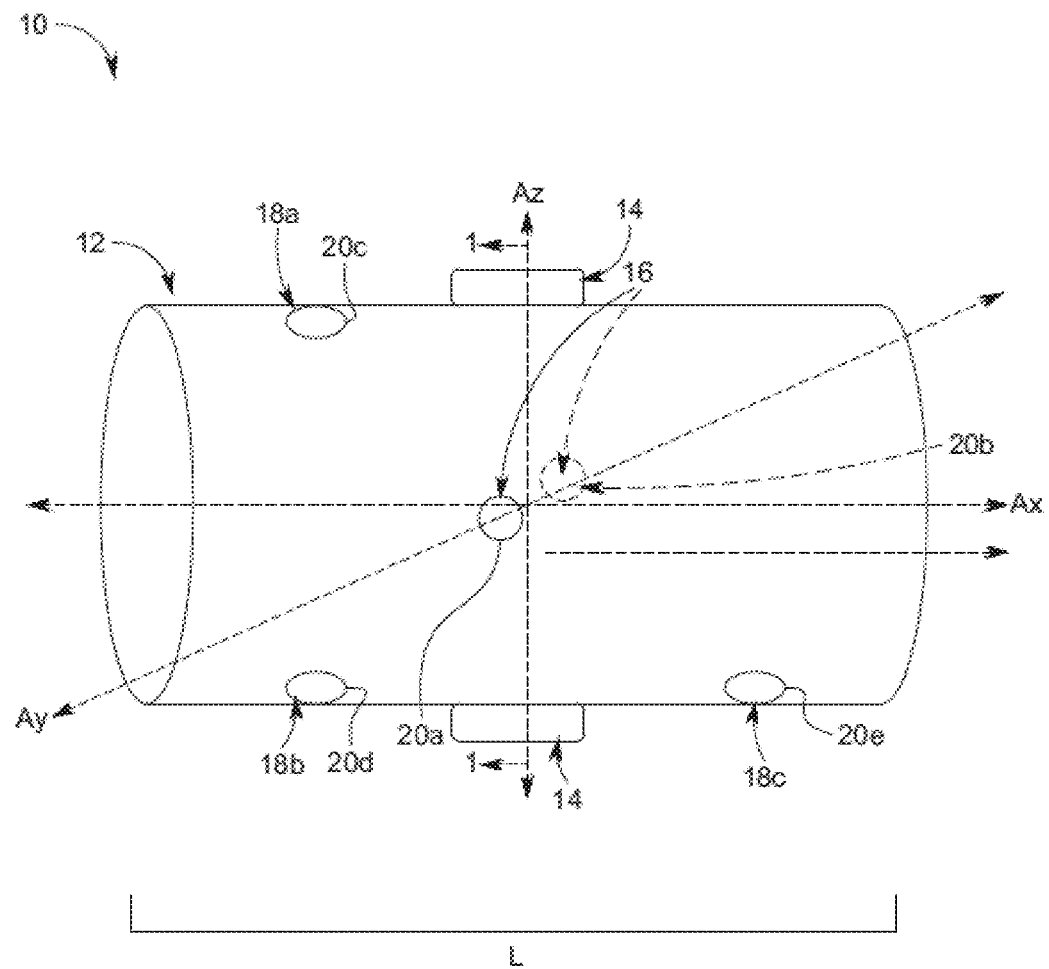
FIG. 1 is a simplified perspective view of a magnetic flowmeter assembly in accordance with the present invention.
Figure 2:
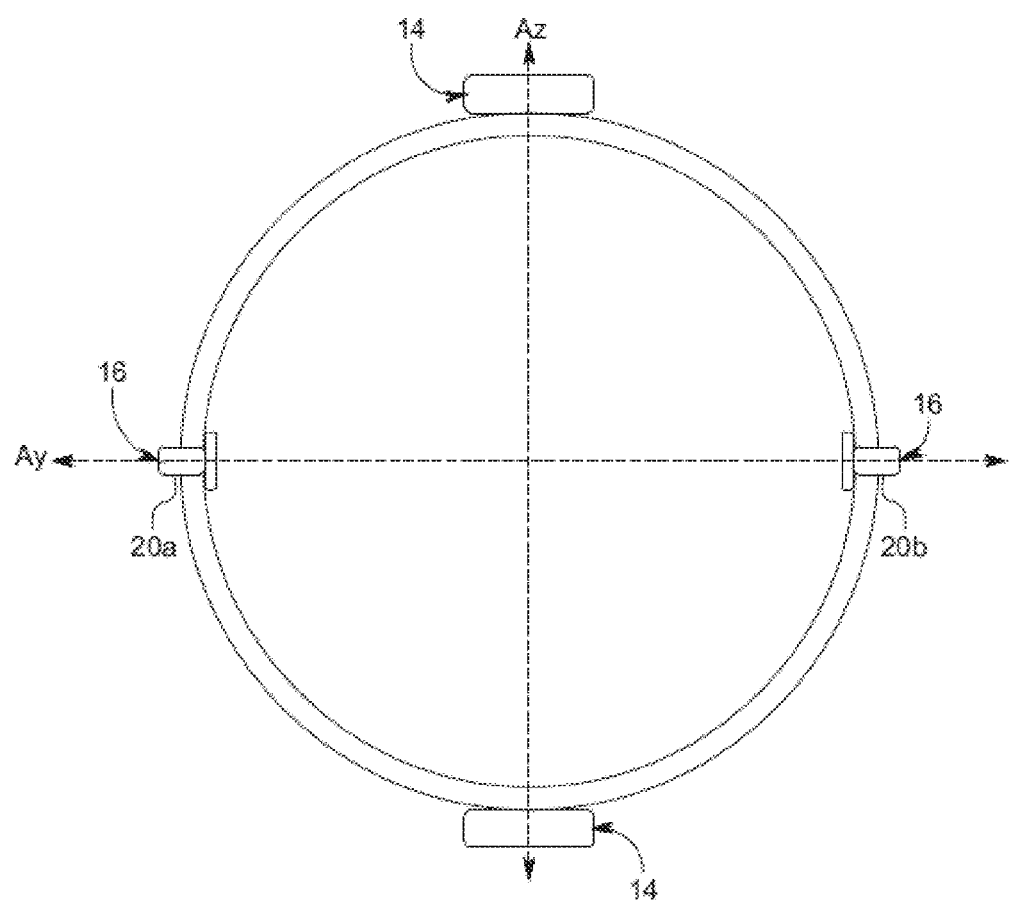
FIG. 2 is a cross sectional view of the magnetic flowmeter assembly of FIG. 1, taken along line 1-1 (FIG. 1).

Referring now to the drawings, and particularly FIGS. 1 and 2, there is shown an magnetic flowmeter assembly 10 having a tubular body, e.g., pipe, 12 that terminates in opposing open ends, aligned along a longitudinal axis (Ax), defining a fluid flow path therebetween. The assembly 10 includes a pair of coil assemblies 14 coupled to an intermediate region thereof. The coil assemblies are externally coupled to tubular body, aligned along an axis (Az) that is orthogonal to the longitudinal axis (Ax), to generate a magnetic field within the fluid flow path of the tubular body.

A pair of measuring electrodes 16 are attached to the pipe 12 aligned along an axis (Ay) orthogonal to the longitudinal axis (Ax) and orthogonal to the axis (Az), in the intermediate region. The measuring electrodes 16 are in electrical communication with the fluid within the fluid flow path. In this manner, the measuring electrodes detect voltage of the fluid induced by the magnetic field of the coil assemblies 14.

The magnetic flowmeter assembly 10 further includes a plurality of auxiliary electrodes 18 (a, b, c), including a first auxiliary electrode 18(a) and a second auxiliary electrode 18(b) that are disposed upstream of the pair of measuring electrodes 16. The first and the second auxiliary electrodes are aligned with the axis (Az), on opposing sides of the pipe, such that axis (Ay) and axis (Az) are coplanar. A third auxiliary electrode 18(c) is disposed downstream of the pair of measuring electrodes 16. The measuring electrodes and the auxiliary electrodes are each mounted to a corresponding aperture 20 (a-e) formed in the wall of the pipe 12.

The tubular body, pipe 12, is formed of thermoplastic material, e.g., such as chlorinated polyvinyl chloride (CPVC), polyvinyl chloride (PVC), or polyvinylidene fluoride (PVDF). Preferably, the pipe is formed of the same pipe used in other portions of the fluid flow system (not shown), to include the type of pipe material (e.g., CPVC, PVC or PVDF) and size (e.g., pipe diameter). End connectors (FIG. 7) are positioned at the opposing ends of the pipe 12 to couple the assembly 10 in line along the fluid flow system.

Figure 3:
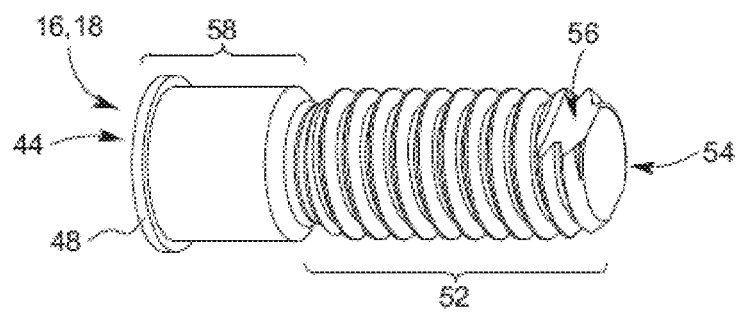
FIG. 3 is a simplified perspective view of an electrode of a magnetic flowmeter assembly in accordance with the present invention.

With reference now to FIG. 3, an exemplary electrode, of electrodes 16, 18, is depicted. Each electrode has a threaded portion 52 that terminates in a distal end 54, which includes a planar portion 56 that interrupts the threading of the threaded portion, proximate to the distal end. The treaded portion 52 extends from a cylindrical portion 58, terminating in a proximal end 44, which includes an annular shoulder 48.

Figure 4:
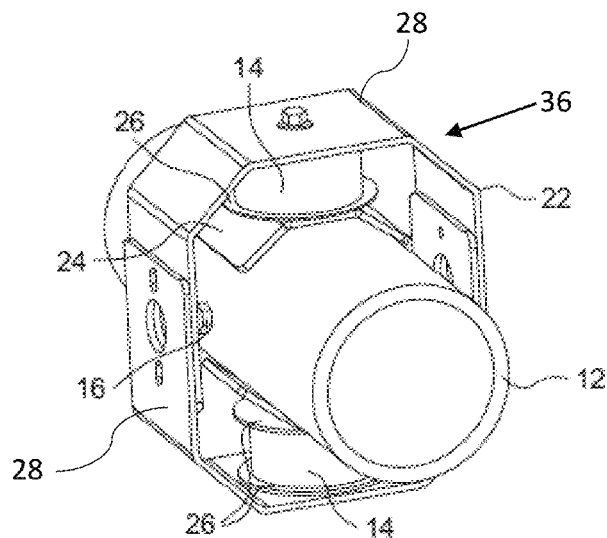
FIG. 4 is a simplified perspective view of a magnetic flowmeter assembly in accordance with the present invention, including a brace coupled to a pair of coils forming magnetic circuitry circumscribing the pipe.

With reference now to FIG. 4, the coil assemblies 14 coupled to the pipe 12 in intermediate region thereof. The coil assemblies are mounted external to the pipe, aligned along the axis (Az). More particularly, each coil 14 is held in place by a brace 22 that circumscribes the pipe 12. A magnetic pole 24 is disposed between the coil 14 and the pipe. The magnetic pole is formed of conductive material, e.g., metal same as the magnetic brace, soft magnetic Carbon Steel with Fe %>99.4, and shaped to conform about the pipe. Non-conductive (airgap) shims 26 are disposed on opposing ends of the coils. With each coil, a first airgap shim 26 is sandwiched between the coil and the corresponding magnetic pole 24, and a second airgap shim 26 is sandwiched between the coil and the brace 22. In each coil, there is a core 50 made of a material with good magnetic properties. These cores 50 (see, FIG. 7) are transferring the flux lines from the coils into the pole shoes and the magnetic brace.

The brace 22 further serves as magnetic circuitry for the magnetic field generated by the coils 14. The brace has a generally octagonal shape, which benefits assembly and operation of the assembly 10. More particularly, the brace 22 is formed of two, generally c-shaped components 28 that slidably mate with each other about the pipe, to couple to each other. In this manner, the brace 22 can be used on pipes having different diameters. Attachments (e.g., bolts 30) couple the coils to the brace along the axis (Az).

The assembly 10 is configured to generate a strong alternating magnetic field (flux) B that is distributed evenly over the pipe cross-section. Utilizing an alternating magnetic field avoids electrode material migration. Configuration of the brace 22, e.g., including shape and materials, facilitates the resulting magnetic field (flux) B within the pipe 12. In the exemplary embodiment the brace 22 is formed "soft" magnetic materials, which refers to relative permeability, meaning is has no remnant magnetization, when shut down.

Figure 5:
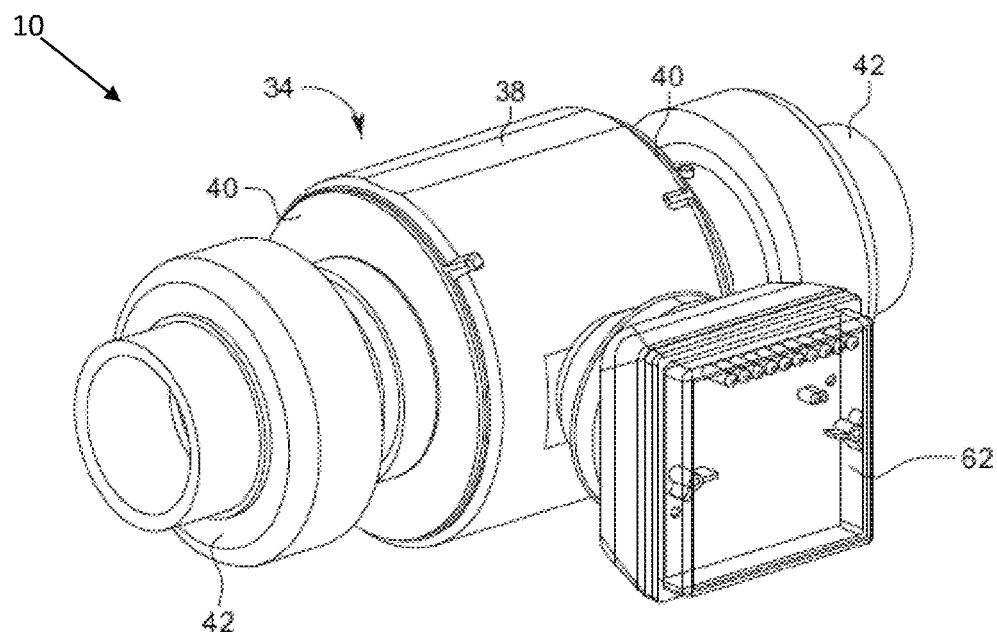
FIG. 5 is a simplified perspective view of a magnetic flowmeter assembly of FIG. 4, further comprising a shield housing.

With reference now to FIG. 5, the assembly 10 further includes a housing 34 configured to protect the magnetic field generator 36 (FIG. 4), which includes the coils 14 and the brace 22. The housing 34 includes a body shell 38 and pipe-sealed flanges 40 on opposing ends thereof. In some embodiments, the housing can be formed of a pipe having a greater diameter than the primary pipe 12. The housing 34 is configured to protect the magnetic field generator from environmental exposure. Fittings 42 are used to couple the assembly 12 to adjoining pipes (not shown) in the fluid flow system.

Figure 6:
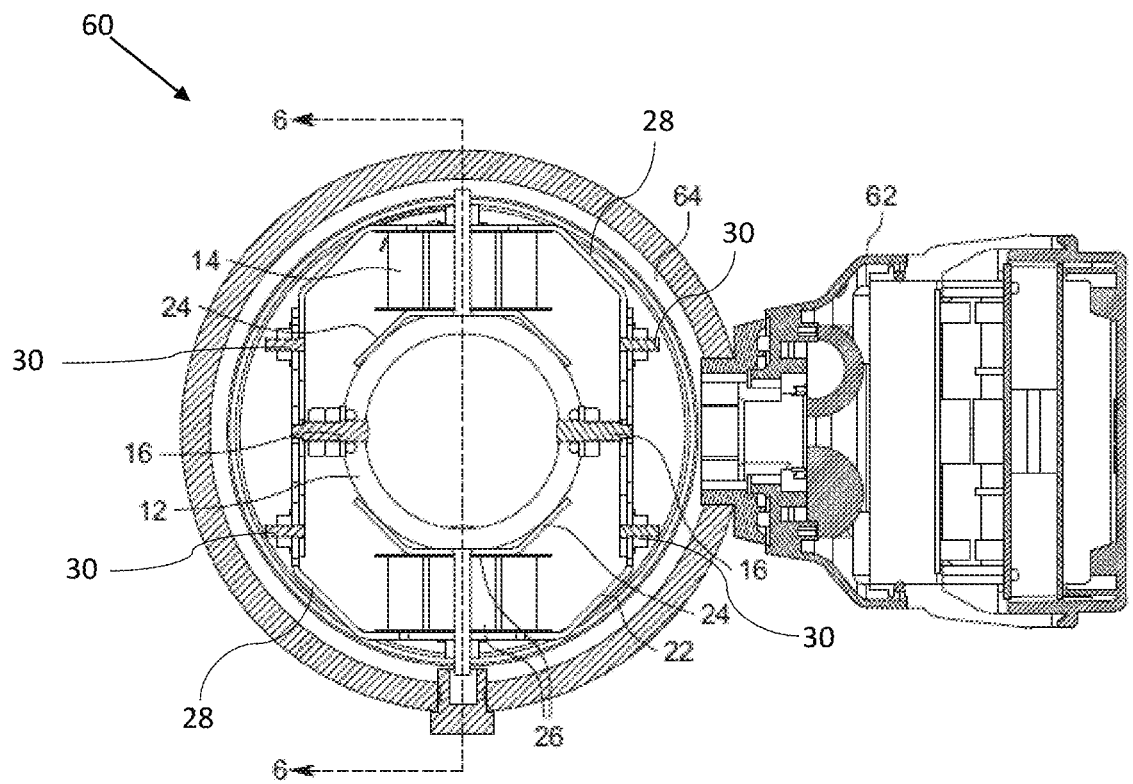
FIG. 6 is a cross sectional view of a magnetic flowmeter assembly in accordance with the present invention, taken along line 7-7 (FIG. 7), including a circuitry assembly coupled to shield housing disposed about a magnetic assembly.
Figure 7:
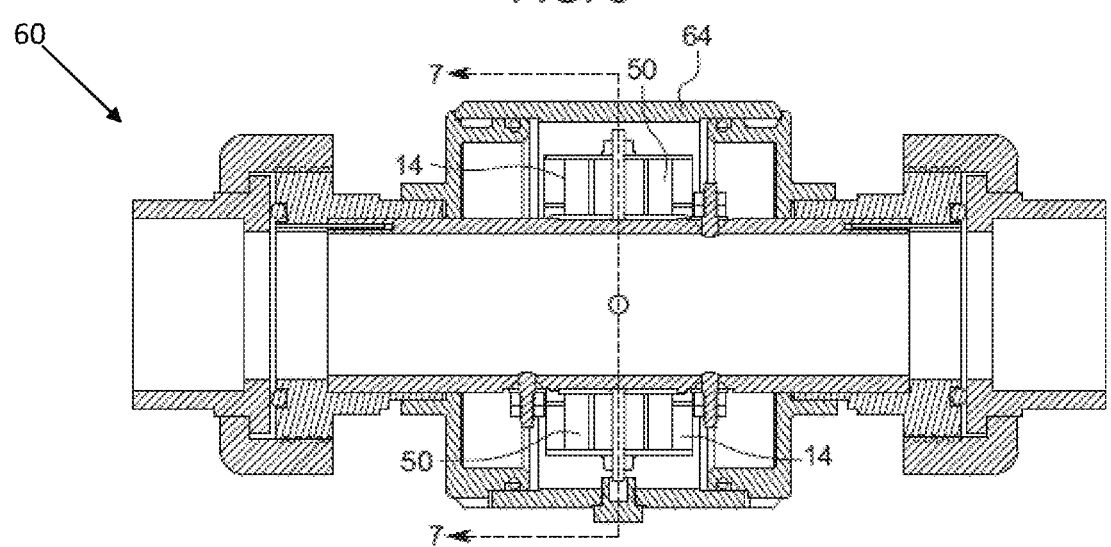
FIG. 7 is a cross sectional view of the magnetic flowmeter assembly of FIG. 6, taken along line 6-6.

With reference now to FIGS. 6 and 7, a magnetic flowmeter assembly 60 is shown, having similar features as discussed above. The assembly 60 includes an electronics assembly 62 attached to the housing 64 of the assembly 60. The electronics assembly is in electrical communication with the electrodes 16, 18 and the coils 14 of the assembly to operate the assembly.

In a method of manufacture, a pipe 12 is selected having the same parameters of other portions of the fluid flow system. The pipe is cut to a prescribed length (L) to accommodate the desired location of the sensor assembly 10 within the fluid flow system. Then, apertures 20 (a-e) are drilled in the pipe at the desired locations of the electrodes. The electrodes 16, 18 are then mounted in place.

It should be appreciated from the foregoing that the invention provides magnetic flowmeter assembly having a tubular body, e.g., pipe, that terminates in opposing open ends, aligned along a longitudinal axis (Ax), defining a fluid flow path therebetween. The assembly includes a pair of coil assemblies coupled to an intermediate region thereof. The coil assemblies are externally coupled to tubular body, aligned along an axis (Az) that is orthogonal to the longitudinal axis (Ax), to generate a magnetic field within the fluid flow path of the tubular body. A pair of measuring electrodes are attached to the pipe aligned along an axis (Ay) orthogonal to the longitudinal axis (Ax) and orthogonal to the axis (Az), in the intermediate region. The measuring electrodes are in electrical communication with the fluid within the fluid flow path. In this manner, the measuring electrodes detect voltage of the fluid induced by the magnetic field of the coil assemblies.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A full bore magnetic flowmeter assembly, comprising:
  a tubular body having opposing open ends and defining a fluid flow path therebetween along a longitudinal axis (Ax), the tubular body attaches inline within a fluid flow system having piping formed of a prescribed material, the tubular body formed of the prescribed material of the piping of the fluid flow system, the body defines a plurality of apertures spaced part from each other;
  a pair of coil assemblies coupled to the tubular body in an intermediate region thereof, the pair of coil assemblies each having a magnetic pole and are each disposed external to the tubular body on opposing sides of the body aligned along an axis (Az), the pair of coil assemblies are configured to generate a magnetic field within the fluid flow path of the tubular body;

a brace that circumscribes the tubular body and that is operatively coupled to the pair of coil assemblies, serving as magnetic circuitry for the magnetic field generated;

each coil assembly further including a first air gap shim sandwiched between the coil and magnetic pole and a second air gap shim sandwiched between the coil and brace;

a pair of measuring electrodes attached to the tubular body, each measuring electrode of the pair of electrodes coupled to a corresponding aperture of the plurality of apertures to be in electrical communication with the fluid with the flow path, the pair of electrodes are aligned along an axis (Ay) orthogonal to the longitudinal axis (Ax) and orthogonal to the axis (Az).

2. The magnetic flowmeter assembly as defined in claim 1, wherein the tubular body is formed of thermoplastic material.

3. The magnetic flowmeter assembly as defined in claim 1, wherein the tubular body is formed of thermoplastic material selected from a group consisting of CPVC, PVC, and PVDF.

4. The magnetic flowmeter assembly as defined in claim 1, wherein axis (Ay) and axis (Az) are coplanar.

5. The magnetic flowmeter assembly as defined in claim 1, wherein the brace comprises two c-shaped components that slidably mate with each other about the pipe, to couple to each other.

6. The magnetic flowmeter assembly as defined in claim 1, wherein the pair of coil assembly are attached to the brace along the axis (Az) via attachment assemblies.

7. The magnetic flowmeter assembly as defined in claim 1, further comprising a protective housing disposed about the brace.

8. A full bore magnetic flowmeter assembly, comprising:

a tubular body having opposing open ends and defining a fluid flow path therebetween along a longitudinal axis (Ax), the tubular body attaches inline within a fluid flow system having piping formed of a prescribed material, the tubular body formed of the prescribed material of the piping of the fluid flow system, the body defines a plurality of apertures spaced part from each other along a sidewall thereof;

a pair of coil assemblies coupled to the tubular body in an intermediate region thereof, the pair of coil assemblies each having a magnetic pole and are each disposed external to the tubular body on opposing sides of the body aligned along an axis (Az), the pair of coil assemblies are configured to generate a magnetic field within the fluid flow path of the tubular body;

a brace that circumscribes the tubular body and that is operatively coupled to the pair of coil assemblies, serving as magnetic circuitry for the magnetic field generated;

each coil assembly further including a first air gap shim sandwiched between the coil and magnetic pole and a second air gap shim sandwiched between the coil and brace;

a pair of measuring electrodes attached to the tubular body, each measuring electrode of the pair of electrodes coupled to a corresponding aperture of the plurality of apertures to be in electrical communication with the fluid with the flow path, the pair of electrodes are aligned along an axis (Ay) orthogonal to the longitudinal axis (Ax) and orthogonal to the axis (Az) such that axis (Ay) and axis (Az) are coplanar; and a plurality of auxiliary electrodes attached to the tubular body in electrical communication with the fluid with the flow path, including a first auxiliary electrode and a second auxiliary electrode that are disposed upstream of the pair of measuring electrodes and that are disposed on opposing sides of the body aligned with axis (Az), further including a third auxiliary electrode downstream of the pair of measuring electrodes.

9. The magnetic flowmeter assembly as defined in claim 8, wherein the tubular body is formed of thermoplastic material selected from a group consisting of CPVC, PVC, and PVDF.

10. The magnetic flowmeter assembly as defined in claim 8, wherein the brace comprises two c-shaped components that slidably mate with each other about the pipe, to couple to each other.

11. The magnetic flowmeter assembly as defined in claim 8, wherein the pair of coil assembly are attached to the brace along the axis (Az) via attachment assemblies.

12. The magnetic flowmeter assembly as defined in claim 8, further comprising a protective housing disposed about the brace.

13. A full bore magnetic flowmeter assembly, comprising:

a tubular body having opposing open ends and defining a fluid flow path therebetween along a longitudinal axis (Ax), the tubular body attaches inline within a fluid flow system having piping formed of a prescribed material and having a prescribed diameter, the tubular body of formed the prescribed material and having the prescribed diameter of the piping of the fluid flow system, the body defines a plurality of apertures spaced part from each other drilled through a sidewall thereof, the tubular body is formed of thermoplastic material;

a pair of coil assemblies coupled to the tubular body in an intermediate region thereof, the pair of coil assemblies each having a magnetic pole and are each disposed external to the tubular body on opposing sides of the body aligned along an axis (Az), the pair of coil assemblies are configured to generate a magnetic field within the fluid flow path of the tubular body;

a pair of measuring electrodes attached to the tubular body, each measuring electrode of the pair of electrodes coupled to a corresponding aperture of the plurality of apertures to be in electrical communication with the fluid with the flow path, the pair of electrodes are aligned along an axis (Ay) orthogonal to the longitudinal axis (Ax) and orthogonal to the axis (Az) such that axis (Ay) and axis (Az) are coplanar;

a plurality of auxiliary electrodes attached to the tubular body in electrical communication with the fluid with the flow path, including a first auxiliary electrode and a second auxiliary electrode that are disposed upstream of the pair of measuring electrodes and that are disposed on opposing sides of the body aligned with axis (Az), further including a third auxiliary electrode downstream of the pair of measuring electrodes;

a brace that circumscribes the tubular body and that is operatively coupled to the pair of coil assemblies, serving as magnetic circuitry for the magnetic field generated;

each coil assembly further including a first air gap shim sandwiched between the coil and magnetic pole and a second air gap shim sandwiched between the coil and brace;

a protective housing including a body shell surrounding the brace, the shell having opposing open ends, flanges sealed to the opposing open ends of the shell; and fittings on the opposing open ends of the shell coupled to adjoining pipes.

14. The magnetic flowmeter assembly as defined in claim 13, wherein the brace comprises two c-shaped components that slidably mate with each other about the pipe, to couple to each other.

15. The magnetic flowmeter assembly as defined in claim 13, wherein the pair of coil assembly are attached to the brace along the axis (Az) via attachment assemblies.

16. The magnetic flowmeter assembly as defined in claim 13, wherein the tubular body is formed of thermoplastic material selected from a group consisting of CPVC, PVC, and PVDF.

* * * * *